(12) United States Patent
Nakamura et al.

(10) Patent No.: US 9,026,186 B2
(45) Date of Patent: May 5, 2015

(54) SLIDE ASSIST SYSTEM

(71) Applicant: Fujitsu Limited, Kawasaki-shi, Kanagawa (JP)

(72) Inventors: Yutaka Nakamura, Atsugi (JP); Hiroshi Takizawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 93 days.

(21) Appl. No.: 14/041,800

(22) Filed: Sep. 30, 2013

(65) Prior Publication Data

US 2014/0031088 A1    Jan. 30, 2014

Related U.S. Application Data

(63) Continuation of application No. PCT/JP2011/058303, filed on Mar. 31, 2011.

(51) Int. Cl.
*H04M 1/00* (2006.01)
*H04M 1/02* (2006.01)
*G06F 1/16* (2006.01)

(52) U.S. Cl.
CPC ............ *H04M 1/0237* (2013.01); *Y10T 16/538* (2015.01); *G06F 1/1624* (2013.01); *H04M 1/0216* (2013.01); *H04M 1/0233* (2013.01); *G06F 1/1616* (2013.01); *G06F 1/1622* (2013.01)

(58) Field of Classification Search
CPC ........................... H04M 1/0235; H04M 1/0237
USPC ................ 455/90.1, 90.2, 90.3, 550.1, 575.1, 455/575.4; 379/433.01, 433.11, 433.12
See application file for complete search history.

(56) References Cited

U.S. PATENT DOCUMENTS 8,099,145 B2 *  1/2012  Yeh ............................ 455/575.4
8,284,554 B2 * 10/2012  Stone et al. ............. 361/679.56
8,634,884 B2 *  1/2014  Kim et al. .................. 455/575.4
8,818,469 B2 *  8/2014  Yu .............................. 455/575.4

FOREIGN PATENT DOCUMENTS

| JP | 2006-26332 | 2/2006 |
| JP | 2008-501288 | 1/2008 |
| JP | 2009-141795 | 6/2009 |
| JP | 2010-246148 | 10/2010 |
| JP | 2011-49956 | 3/2011 |

OTHER PUBLICATIONS

International Search Report of PCT/JP2011/058303 mailed Jun. 14, 2011.

* cited by examiner

*Primary Examiner* — Nhan Le
(74) *Attorney, Agent, or Firm* — Staas & Halsey LLP

(57) ABSTRACT

A slide assist system provided between sliding surfaces of a fixed housing and a movable housing provided with a spring, endpiece members swingably attached to the two ends of the spring, two parallel ridges each is provided sticking out at the fixed housing and the movable housing, wherein the spring is expanded or contracted to insert it in a clearance between the two parallel ridges, one of the endpiece members is made to engage with an engagement part of the fixed housing side ridge, the other is made to engage with an engagement part of the movable housing side ridge, and, in the state where the fixed housing and the movable housing are superposed and the state where they are slid, the engagement part of the fixed housing side ridge and the engagement part of the movable housing side ridge which engage with the same endpiece member are switched.

19 Claims, 19 Drawing Sheets

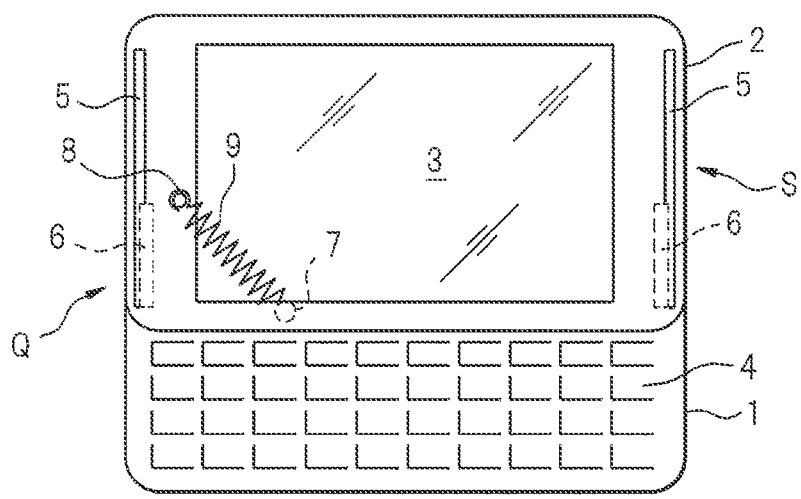

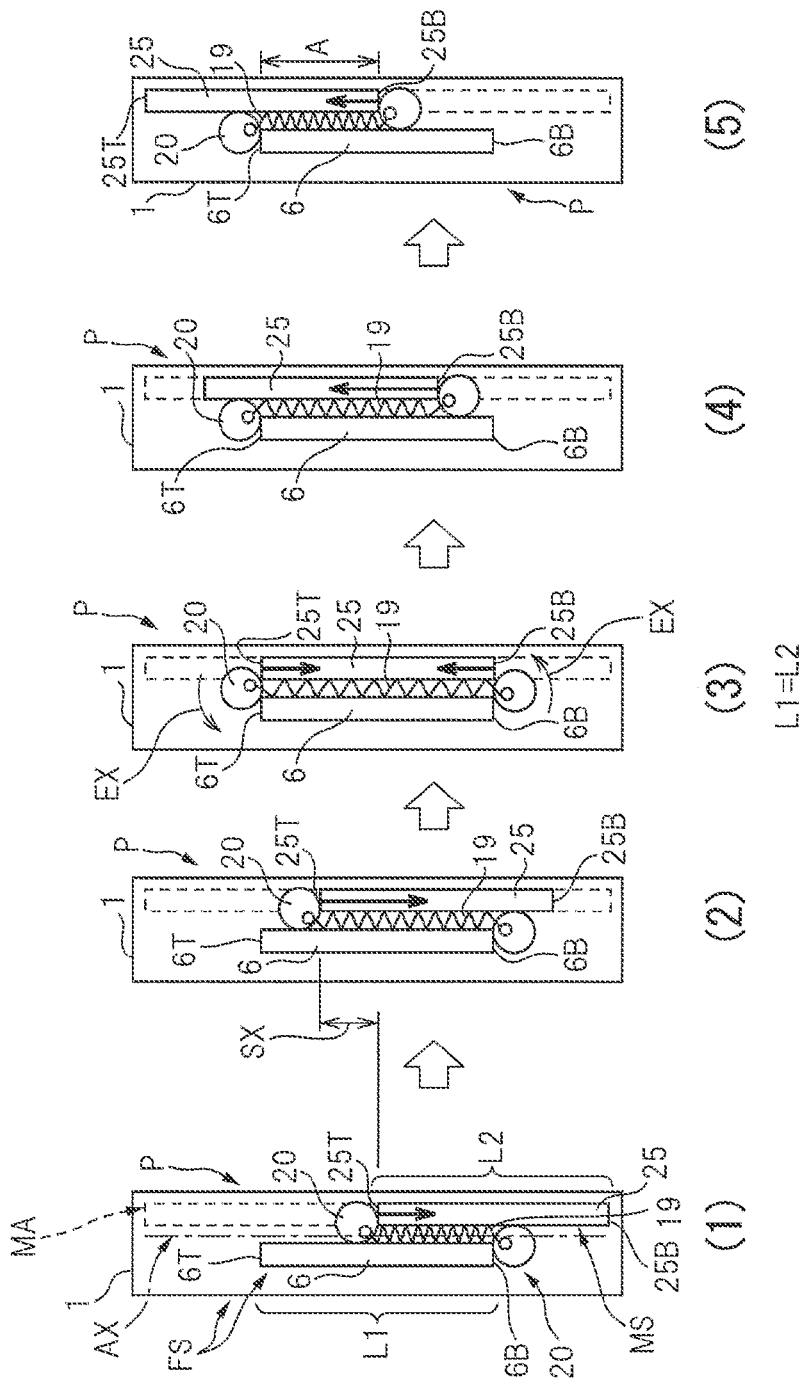

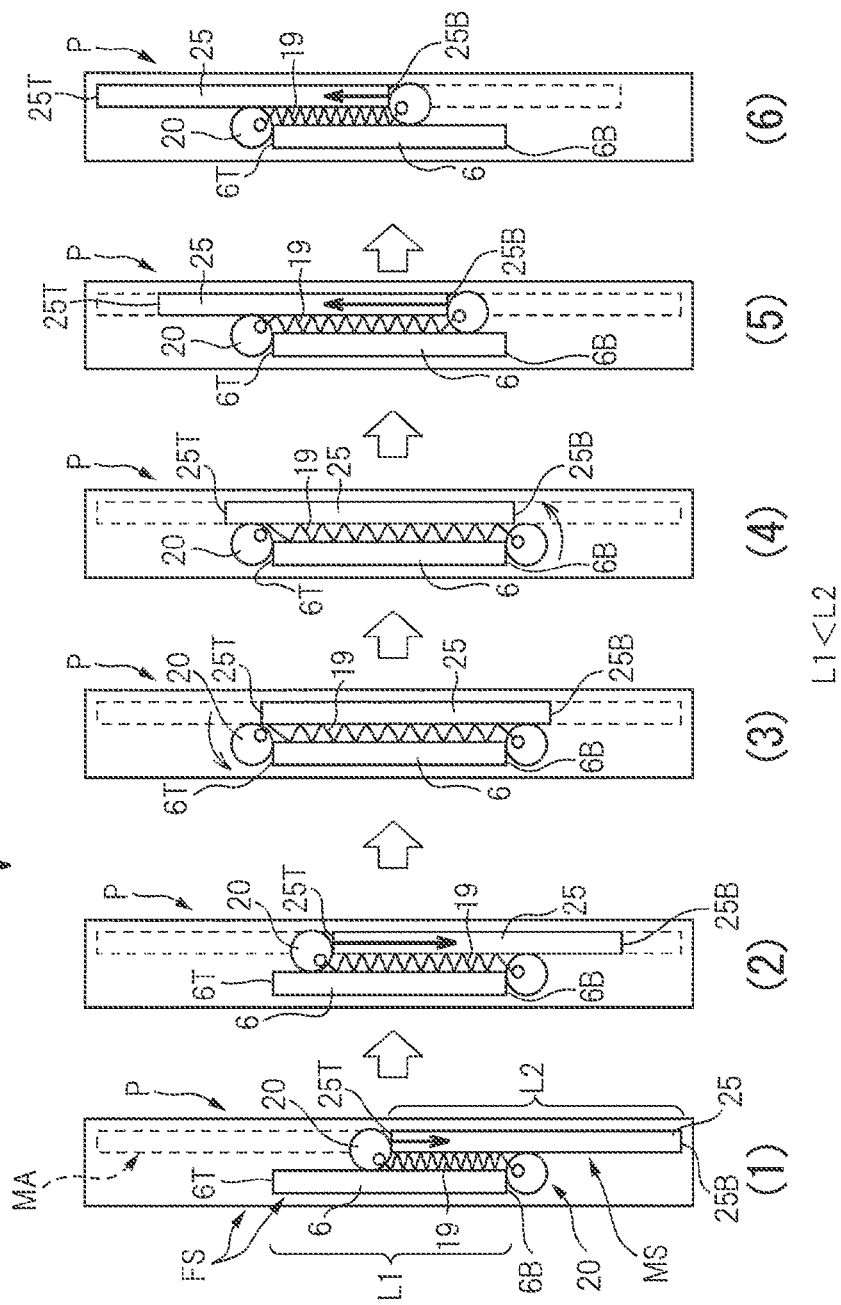

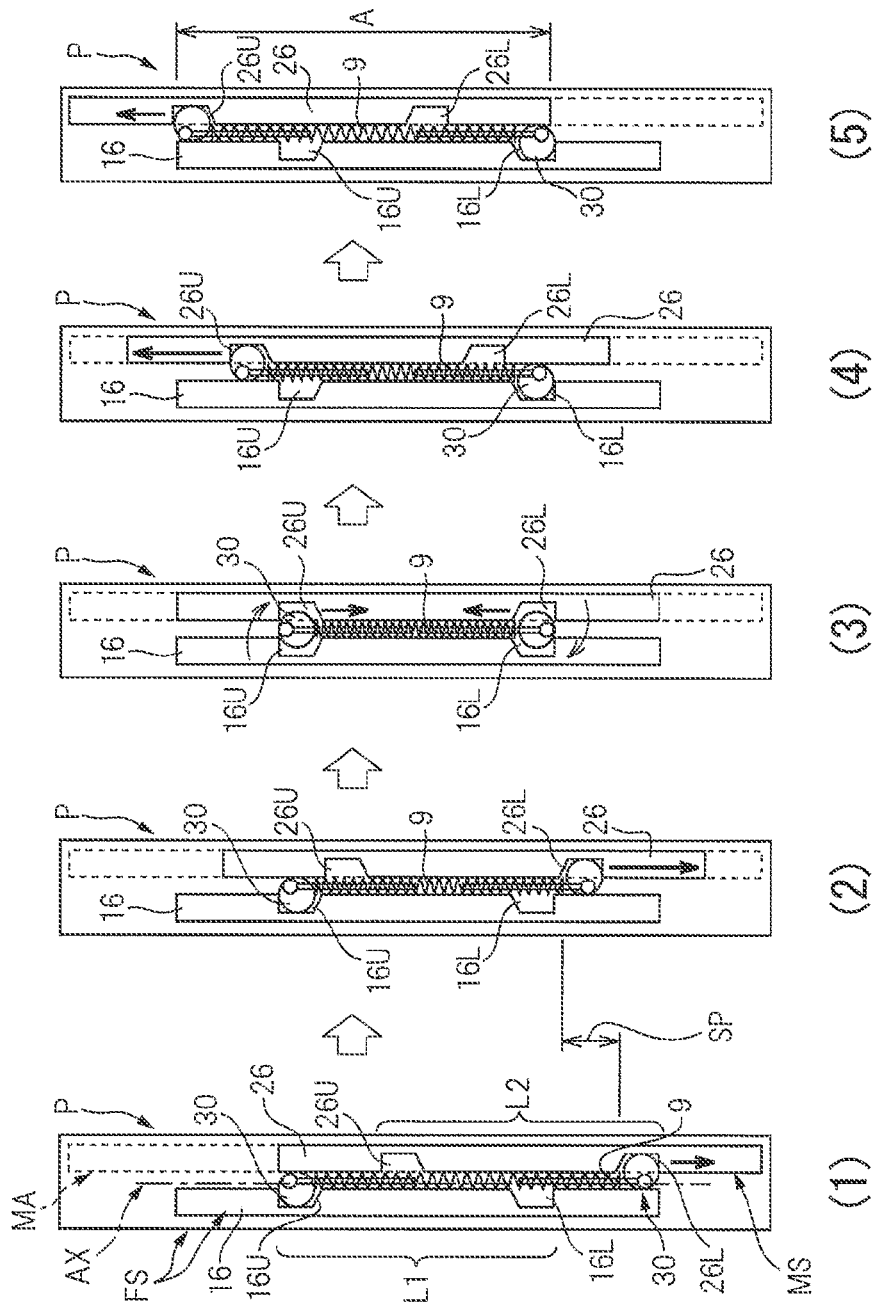

SLIDE ASSIST SYSTEM

CROSS-REFERENCE TO RELATED APPLICATION

This application is a continuation application based upon, and claims priority of, PCT Application No. PCT/JP2011/058303, filed on Mar. 31, 2011, the contents being incorporated herein by reference.

FIELD

The present application relates to a slide assist system. In the embodiments which are explained below, a slide assist system which augments an external force to enable easy sliding when making one member or one housing slide with respect to another member or another housing by application of an external force will be explained. This slide assist system is provided with a movement mechanism which is provided with an elastic member for augmenting an external force. Further, as a product which is provided with the slide assist system of the present application, in particular a slide type of terminal or mobile phone will be explained.

BACKGROUND

In recent years, the increasingly smaller size and greater thinness of mobile phones and other information terminals have led to numerous products with display parts and other moving parts made to slide or turn with respect to keyboard parts and other fixed parts for the purpose of improving the portability, operability, and ease of viewing of the displays. In such information terminals, two housings which change in position relative to each other, for example, a display side housing and a keyboard side housing, are required to be able to be easily made to slide or turn. To enable the slide movement or turning movement operation to be easily performed, it is desirable that there be an assist force in a direction causing approach to the movement end position near the two ends of movement of the two housings.

As a system which gives such an assist force, an assist spring mechanism which assists opening and closing of a slide type mobile phone is disclosed in Japanese Laid Open Patent Publication No. 2008-501288A. The assist spring mechanism which is disclosed in Japanese Laid Open Patent Publication No. 2008-501288A attaches a compression spring with two ends which have a degree of freedom of rotation at the fixed side and the moving side to the housings, makes the housings open and close along a slide guide, and, at that time, makes the compression spring compress and simultaneously makes it turn to cause an assist force to act (see FIG. 1).

Further, a mechanism which makes a moving member move between a pulled-in position and a pulled-out position with respect to a base member wherein the moving member is made to slide from an intermediate position of movement by the biasing force of a spring automatically to either the pulled-in position or the pulled-out position is disclosed in Japanese Laid Open Patent Publication No. 2006-26332A. The base member and moving member which Japanese Laid Open Patent Publication No. 2006-26332A covers are the main body of storage furniture etc. and a drawer which is pulled out from the main body. A slide assist system is provided between the main body and the drawer.

However, the assist spring mechanism which is disclosed in Japanese Laid Open Patent Publication No. 2008-501288A does not allow other parts to be arranged in the housing in the range in which the compression spring turns. Wasteful space is formed in the housings making further reduction of thickness and size difficult. Further, in Japanese Laid Open Patent Publication No. 2006-26332A, the moving member is made to move linearly with respect to the base member without making it turn, but the structure is complicated and there are limits to reduction of size. The system was not suited to mobile phones and other small sized devices.

SUMMARY

Therefore, the present application provides a slide assist system in which just movement of a small number of parts along an axis of a sliding direction of two objects which slide relative to each other enables an assist force to be generated at the time of sliding and in which the occupied space is small and greater thinness of the device is possible. Further, it provides a slide assist system in a telescopic rod which can slide in multiple stages. Furthermore, it provides a terminal device in which a display part slides with respect to a keyboard part and which is provided with a slide assist system which assists a slide mechanism.

In a first aspect of the present application, there is provided a slide assist system which is provided at facing surfaces of a fixed housing and a movable housing which can slide with respect to the fixed housing along a predetermined axis by a predetermined distance, wherein the slide assist system is configured provided with a columnar elastic member which can expand and contract, endpiece members which are attached to the two ends of the elastic member to be able to swivel and are provided with horizontal widths which are larger than the horizontal width of the elastic member, a fixed housing side ridge which is provided sticking out at a facing surface of the fixed housing, extends in the axial direction, and is provided with a predetermined length and which is provided with engagement parts with the endpiece members at its two end sides, and a movable housing side ridge which is provided sticking out at a facing surface of the movable housing, extends in the axial direction, and is provided with a predetermined length and which is provided with engagement parts with the endpiece members at its two end sides, the fixed housing side ridge and the movable housing side ridge have a clearance able to hold the columnar elastic member and are arranged at the fixed housing and the movable housing, the elastic member is inserted into the clearance between the fixed housing side ridge and the movable housing side ridge, in the state of insertion of the elastic member into the clearance, one of the endpiece members which are positioned at the two ends of the elastic member is made to engage with an engagement part of the fixed housing side ridge while the other is made to engage with an engagement part of the movable housing side ridge, and the engagement parts are acted on by a biasing force of one of an attraction force which pulls them to the elastic member side and a pushing force which pushes them in a direction separating from the elastic member side, and, in the state where the fixed housing and the movable housing are superposed and in the state where the movable housing slides with respect to the fixed housing by a predetermined distance, the engagement part of the fixed housing side ridge and the engagement part of the movable housing side ridge which engage with the same endpiece member are switched.

In a second aspect of the present application, there are provided slide assist systems which are provided at facing surfaces of a tubular fixed housing and a plurality of movable housings which have horizontal widths which become smaller in stages in an axial direction of the tubular fixed housing and which can slide by increments of a predetermined distance in multiple stages, wherein each slide assist system is provided with a columnar elastic member which can expand and contract, endpiece members which are attached to the two ends of the elastic member to be able to swivel and are provided with horizontal widths which are larger than the horizontal width of the elastic member, a first ridge which is provided sticking out at the facing surface of one of two adjacent housings, extends in the axial direction, and is provided with a predetermined length and which is provided with engagement parts with the endpiece members at its two end sides, and a second ridge which is provided sticking out at the facing surface of the other of the two adjacent housings, extends in the axial direction, and is provided with a predetermined length and which is provided with engagement parts with the endpiece members at its two end sides, the first ridge and the second ridge have a clearance able to hold the columnar elastic member and are arranged at the two adjacent housings, the elastic member is inserted in the clearance of the first ridge and the second ridge and, in the state of insertion of the elastic member into the clearance, one of the endpiece members which are positioned at the two ends of the elastic member is made to engage with an engagement part of the first ridge while the other is made to engage with an engagement part of the second ridge, and the engagement parts are acted on by a biasing force of one of an attraction force which pulls them to the elastic member side and a pushing force which pushes them in a direction separating from the elastic member side, and, in the state where the two adjacent housings are superposed and in the state where they slide by the predetermined distance, the engagement part of the first ridge and the engagement part of the second ridge which engage with the same endpiece member are switched.

Further, in a third aspect of the present application, there is provided a mobile terminal which is provided with a keyboard part which is provided with operating buttons and a display part which is provided with a display screen and in which the display part can slide or turn with respect to the keyboard part along a predetermined axis by a predetermined distance, wherein the mobile terminal is provided with a slide assist mechanism at a slide mechanism or turn mechanism of the keyboard part and the display part, the slide assist mechanism is configured provided with a columnar elastic member which can expand and contract, endpiece members which are attached to the two ends of the elastic member to be able to swivel and are provided with horizontal widths which are larger than the horizontal width of the elastic member, a keyboard part side ridge which is provided sticking out at a surface of the keyboard part which faces the display part, extends in the axial direction, and is provided with a predetermined length and which is provided with engagement parts with the endpiece members at its two end sides, and a display part side ridge which is provided sticking out at a surface of the display part which faces the keyboard part, extends in the axial direction, and is provided with a predetermined length and which is provided with engagement parts with the endpiece members at its two end sides, the keyboard part side ridge and the display part side ridge have a clearance able to hold the columnar elastic member and are arranged at the keyboard part and the display part, the elastic member is inserted into the clearance between the keyboard part side ridge and the display part side ridge and, in the state of insertion of the elastic member into the clearance, one of the endpiece members which are positioned at the two ends of the elastic member is made to engage with an engagement part of the keyboard part side ridge while the other is made to engage with an engagement part of the display part side ridge, and the engagement parts are acted on by a biasing force of one of an attraction force which pulls them to the elastic member side and a pushing force which pushes them in a direction separating from the elastic member side, and, in the state where the keyboard part and the display part are superposed and in the state where the display part slides with respect to the keyboard part by a predetermined distance, the engagement part of the keyboard part side ridge and the engagement part of the display part side ridge which engage with the same endpiece member are switched.

BRIEF DESCRIPTION OF DRAWINGS

FIG. 1C is a plan view which illustrate an open state of a mobile phone which is provided with a slide assist system of the related art.

FIG. 5A is a transition diagram which illustrates a slide assist operation of a first example of the first embodiment of the slide assist system of the present application.

FIG. 6A is a transition chart which illustrates a slide assist operation of a second example of the first embodiment of the slide assist system of the present application.

FIG. 7A is a transition chart which illustrates a slide assist operation of one example of the second embodiment of the slide assist system of the present application.

BRIEF DESCRIPTION OF DRAWINGS

Figure 1A:
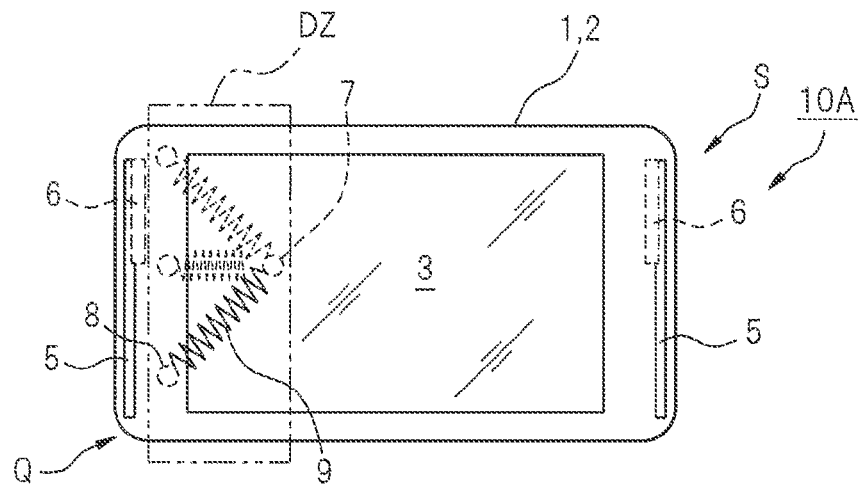
FIG. 1A is a plan view which illustrates a closed state of a mobile phone which is provided with a slide assist system of the related art.

Below, the drawings will be used to explain preferred embodiments of the present application, but before explaining the embodiments of the present application, FIG. 1A to FIG. 1C will be used to explain the configuration and operation of a slide assist system Q in a general mobile terminal 10A as related art. The mobile terminal 10A of this related art is a slide type and is provided with a fixed side fixed housing 1 and a movable housing 2 which slides with respect to the fixed housing 1. The fixed housing 1 has a keyboard 4, while the movable housing 2 has a display 3. Between the fixed housing 1 and the movable housing 2, there is a slide system S which is provided with slide rails 5 and slide guides 6. The slide rails 5 are provided at the movable housing 2, while the slide guides 6 are provided at the fixed housing 1. If making the movable housing 2 move upward with respect to the fixed housing 1, it moves on the slide rails 5 while being guided by the slide guides 6 whereby the keyboard 4 appears from below the movable housing 2.

The slide assist system Q of the related art is designed so that, when the movable housing 2 is being closed over the fixed housing 1, the movable housing 2 is acted upon by a force in the closing direction and so that, when the movable housing 2 is made to move to above the fixed housing 1, the movable housing 2 is acted upon by an assist force in the opening direction. Due to the slide assist system Q of the related art, the movable housing 2 can be made to easily reach the fully open position with respect to the fixed housing 1. The slide assist system Q of the related art is configured provided with a fixed post 7 which is provided at the fixed housing 1 side, a moving post 8 which is provided at the movable housing 2 side, and a compression spring 9 which bridges the fixed post 7 and the moving post 8. In the state where the fixed housing 1 and the movable housing 2 are closed, the fixed post 7 is at a center part in a height direction of the fixed housing 1, the movable post 8 is at the bottom in the height direction of the movable housing 2, and the compression spring 9 bridges the fixed post 7 and the movable post 8 at a slant.

FIG. 1A illustrates a closed state of the mobile terminal 10A which is provided with the slide assist system Q of the related art. At this time, the compression spring 9 is biased in a direction making the fixed post 7 and movable post 8 move away from each other, so the movable housing 2 will not naturally open with respect to the fixed housing 1. If pushing up the movable housing 2 from the fixed housing from this state and opening the movable housing 2 from it, movement of the movable post 8 will cause the distance between the fixed post 7 and the movable post 8 to shrink and cause the compression spring 9 to be gradually compressed and turn. FIG. 1B illustrates an intermediate state between the state where the movable housing 2 is closed over the fixed housing 1 and the state where it is completely opened from it. At the time of this state, the compression spring 9 is the most compressed.

Figure 1B:
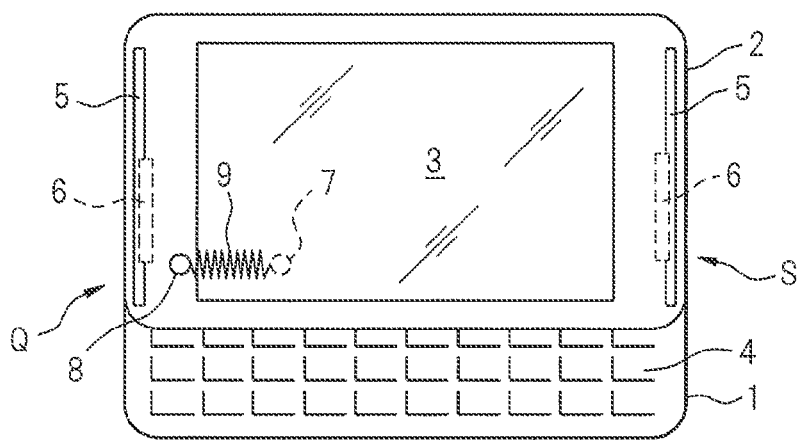
FIG. 1B is a plan view which illustrates an intermediate point in transition of a mobile phone which is provided with a slide assist system of the related art from a closed state to an open state.

If further opening the movable housing 2 from the fixed housing 1 from the state of FIG. 1B, movement of the movable post 8 causes the distance between the fixed post 7 and the movable post 8 to gradually open. At this time, the compression spring 9 biases the movable post 8 in the opening direction. For this reason, the force for opening the movable housing 2 is assisted by the compression spring 9, whereby the movable housing 2 can be opened by a smaller force from the position which is illustrated in FIG. 1B to the fully open position which is illustrated in FIG. 1C. At this time, there are limits to the amount of expansion and contraction of the compression spring 9. Usually, the ratio of length in the longest state:most compressed state is 3:1 to 2:1 or so. Accordingly, the angle of this compression spring 9 with respect to a slide rail 5 has to be 20 degrees to 30 degrees.

In this regard, the slide assist system Q of the related art which is configured in the above way turns in the region DZ which is illustrated by the broken line in FIG. 1A when opening or closing the movable housing 2 with respect to the fixed housing 1. Therefore, there was the issue that other parts could not be arranged in the region which is illustrated by the region DZ at the back side of the display 3. For this reason, the mounting area for circuit parts required for the mobile terminal 10A is reduced. There was the problem that the mobile terminal 10A was lengthened in the thickness direction by that extent, parts which could not be mounted had to be arranged in the thickness direction of the housing, and the device increased in thickness.

Figure 2A:
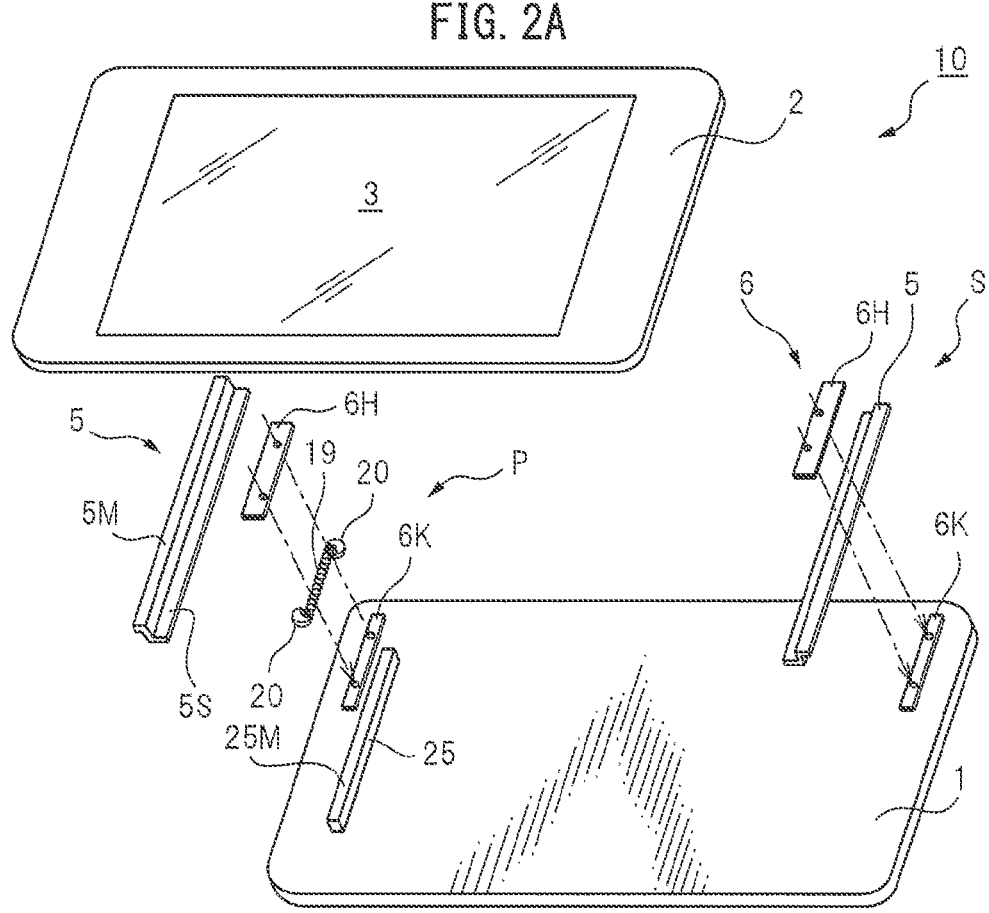
FIG. 2A is a disassembled perspective view of a mobile phone which illustrates the configuration of a slide assist system of a first embodiment of the present application which is attached to a slide system of a mobile phone.

The present application was made so as to solve the problems in such a slide assist system Q of the related art and provides a novel, small sized slide assist system. Note that, in the embodiments of the present application which are explained later, components the same as in the mobile terminal 10A which was explained from FIG. 1A to FIG. 1C are explained while assigned the same reference notations. FIG. 2A illustrates a mobile terminal 10 disassembled so as to illustrate the configuration of a slide assist system P of a first embodiment of the present application which is attached to a slide system S which was explained with reference to FIG. 1A to FIG. 1C.

The slide system S is provided with slide rails 5 which are attached to the movable housing 2 and slide guides 6 which are attached to the fixed housing 1. The slide rails 5 are configured provided with mounting parts 5M which are attached to the movable housing 2 and sliding parts 5S which slide in the slide guides 6. On the other hand, the slide guides 6 are provided with base parts 6K which are fastened on the fixed housing 1 and overhang parts 6H which are attached to the base parts 6K so as to stick out from the base parts 6K to the slide rail 5 sides. The sliding parts 5S of the slide rails 5 slide through the space between the overhang parts 6H and the fixed housing 1.

Figure 2B:
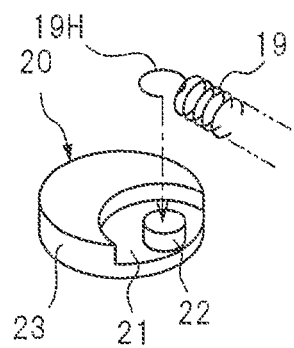
FIG. 2B is a perspective view which illustrates the configuration of one embodiment of endpiece members which are attached to two ends of a tension spring which is illustrated in FIG. 2A.
Figure 2C:
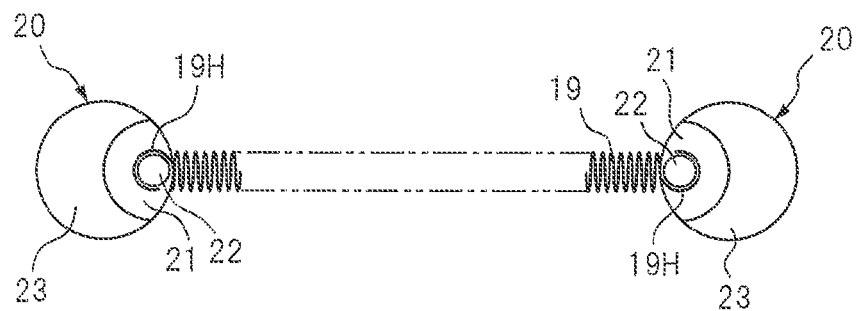
FIG. 2C is a plan view which illustrates the configuration of a tension spring which is illustrated in FIG. 2A and the endpiece members which are attached to the two ends of the same.

The slide assist system P of the first embodiment of the present application is configured by an elastic member comprised of a tension spring 19, endpiece members 20 which are attached to two end parts of this tension spring 19 to be able to swivel, and a ridge 25 to which the mounting part 25M is attached at the back surface of the movable housing 2. The ridge 25 is attached to the back surface of the movable housing 2 away from the slide guide 6 by a distance of an extent where the tension spring 19 can be held. Each endpiece member 20, in this embodiment, as illustrated in FIG. 2B, is comprised of a disk-shaped body 23 with part cut away in an arc to form a cutaway part 21. At the cutaway part 21 near the outer circumference of the body 23, a post 22 is provided. This post 22 has a hook part 19H of the tension spring 19 attached to it. FIG. 2C illustrates the configuration of the tension spring 19 and the endpiece members 20 which are attached to its two end parts which are illustrated in FIG. 2A. The hook parts 19H of the tension spring 19 are just hooked over the posts 22 of the endpiece members 20 so as not to detach, so the endpiece members 20 can swivel with respect to the tension spring 19. In this way, the endpiece members 20 may be disk shapes which have hooking parts (posts 22) to which the spring is hooked and, further, as explained later, can roll well when the engagement parts are switched.

Figure 3:
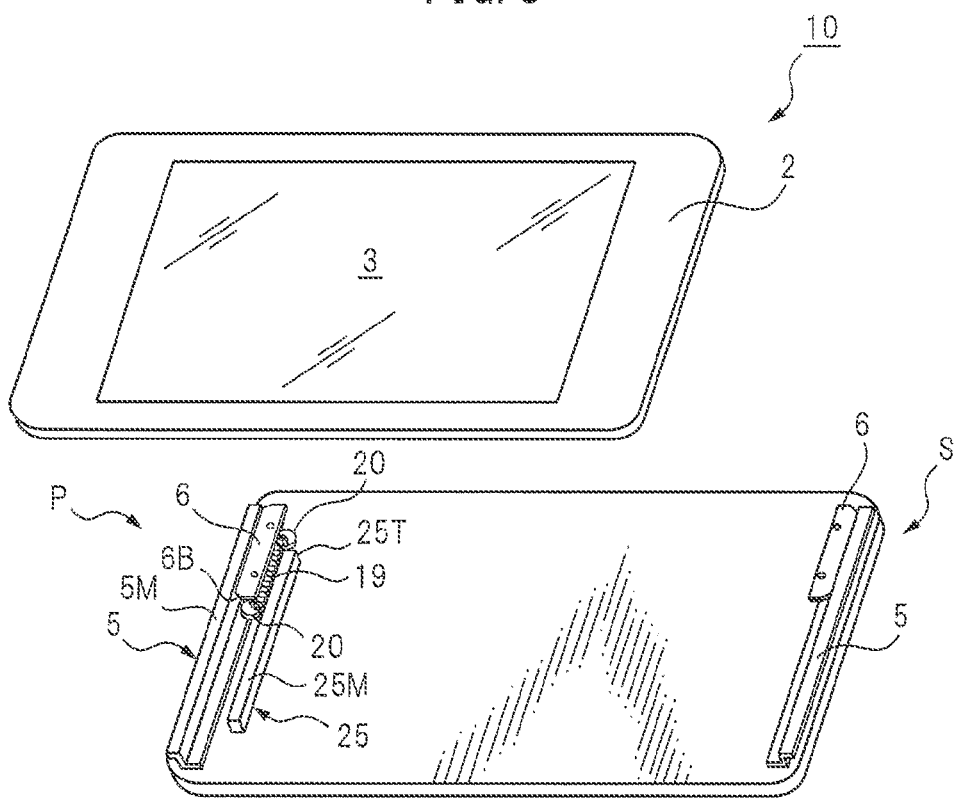
FIG. 3 is a disassembled perspective view of a mobile phone which illustrates the slide assist system of the first embodiment of the present application which is attached to a slide system of a mobile phone which is illustrated in FIG. 2A in the state attached to the slide system.

FIG. 3 illustrates the state where the slide system S of the mobile terminal 10 which is illustrated in FIG. 2A has the slide assist system P of the first embodiment of the present application attached to it. One of the endpiece members 20 which are attached to the two end parts of the tension spring 19 is engaged with the top end part 25T of the ridge 25, while the other is engaged with the bottom end part 6B of the slide guide 6. In this state, the tension spring 19 is in a stretched state. Therefore, in the state with the movable housing 2 superposed over the fixed housing 1, the movable housing 2 receives a force in the closing direction from the tension spring 19, so the movable housing 2 will not easily open from the fixed housing 1.

Figure 4A:
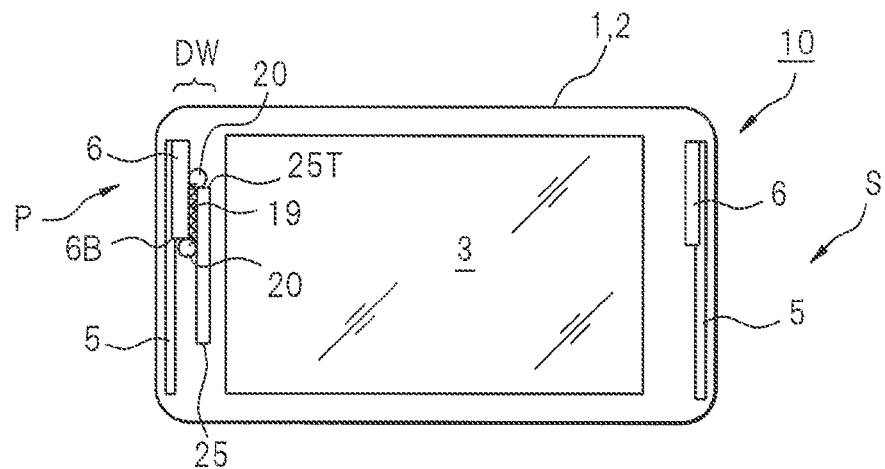
FIG. 4A is a plan view of a state where the mobile phone which is illustrated in FIG. 3 is assembled and closed.
Figure 4B:
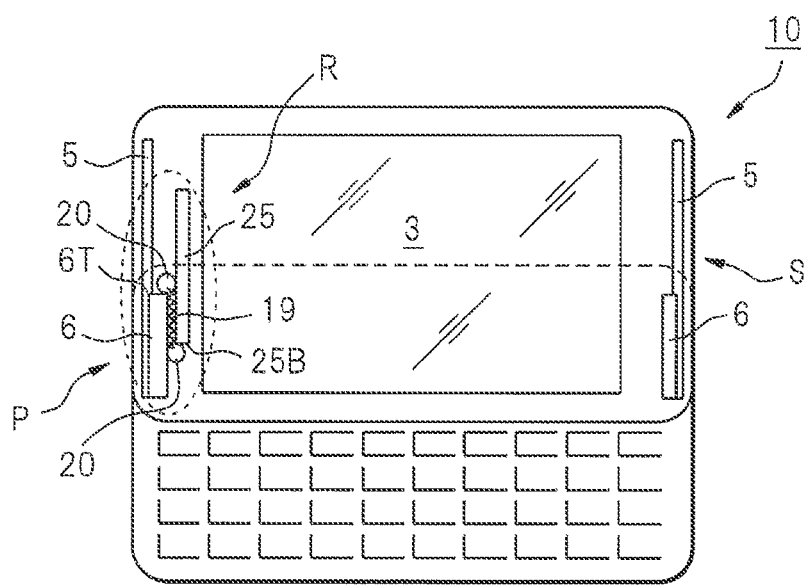
FIG. 4B is a plan view of a state where the mobile phone which is illustrated in FIG. 4A is opened.

FIG. 4A illustrates the state where the mobile terminal 10 which was illustrated in FIG. 3 is assembled and closed, while FIG. 4B illustrates the state where the mobile terminal 10 which was illustrated in FIG. 4A is opened. The slide assist system P of the present application, as will be understood from the region after operation which is illustrated by the broken line R in FIG. 4B, operates in the region which is illustrated by the width DW in FIG. 4A. Compared with the conventional slide assist system Q which was illustrated in FIG. 1A to FIG. 1C, the operating region is extremely narrow.

In the slide assist system P of the present application, as illustrated in FIG. 4A, in the state where the movable housing 2 is closed with respect to the fixed housing 1, one of the endpiece members 20 (top side member 20) is engaged with the top end part 25T of the ridge 25, while the other (bottom side endpiece member 20) is engaged with the bottom end part 6B of the slide guide 6. On the other hand, in the state where the movable housing 2 is opened with respect to the fixed housing 1, as illustrated in FIG. 4B, one of the endpiece members 20 is engaged with the top end part 6T of the slide guide 6, while the other is engaged with the bottom end part 25B of the ridge 25. The operation of such a slide assist system P of the present application will be explained in detail below for various aspects.

Figure 5B:
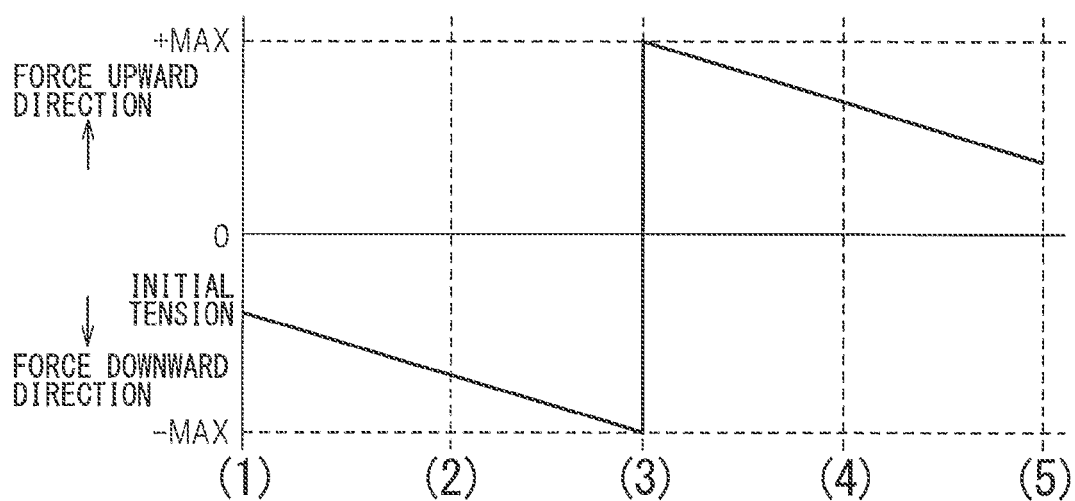
FIG. 5B is a graph which illustrates the change in the assist force which the slide assist system in FIG. 5A gives to the slide system.

In the slide assist system P of the first aspect of the present application, as the elastic member, a tension spring 19 is used. First, the case of a first example where the distance between the two ends of the slide guide 6 is designated as "L1" and the distance between the two ends of the ridge 25 is designated as "L2" and the distance L1 between the two ends equals L2 will be explained using FIG. 5A and FIG. 5B. Here, the explanation will be given focusing on the operation of the slide assist system P, so FIG. 5A illustrates only the principal parts of the slide assist mechanism P. The fixed housing 1 is illustrated in part, while illustration of the movable housing 2 is omitted. Further, the endpiece members 20 are also illustrated simplified.

For this tension spring 19, a coil spring with a circular cross-section or a flattened coil spring with an oval cross-section may be used. Further, as another embodiment of the elastic member, a rubber or other elastic member which has contraction power, an air cylinder which is filled with a gas, etc. may be used.

FIG. 5A illustrates the operation of the slide assist system P of the first aspect of the present application by stages (1) to (5). (1) illustrates the initial state where the movable housing is closed over the fixed housing 1. The broken line MA in the figure illustrates the movable range of the movable side MS (ridge 25), while the one-dot chain line AX illustrates the axis of movement of the movable side MS. Further, the arrow mark which is illustrated by the bold line illustrates the magnitude and direction of the force which acts on the movable side MS. At the stage (1), one of the endpiece members 20 is engaged with the top end part 25T of the ridge 25, while the other is engaged with the bottom end part 6B of the slide guide 6. A downward (closing) force due to the tension of the initial state of the tension spring 19 acts on the top end part 25T of the ridge 25 from the endpiece member 20. For this reason, an assist force acts which helps the movable housing close over the fixed housing 1.

In FIG. 5A, stage (2) illustrates the initial state of operation of the opening operation where the movable housing moves in an opening direction from the fixed housing 1. In the initial state, one of the endpiece members 20 remains engaged with the top end part 25T of the ridge 25, while the other remains engaged with the bottom end part 6B of the slide guide 6. Due to movement of the ridge 25 in the opening direction, the tension spring 19 is extended and the biasing force which is applied from the endpiece member 20 to the top end part 25T of the ridge 25 becomes larger. SX is the amount of extension of the spring 19. The biasing force at this time becomes the downward (closing) force due to the tension in the initial state of the tension spring 19 plus the biasing force of the spring constant times the amount of extension of the tension spring 19.

In FIG. 5A, stage (3) illustrates an intermediate state of the opening operation where the movable housing moves in the opening direction with respect to the fixed housing 1 and opens to a state of half of the fully opened state. In the intermediate state, the two end faces of the fixed side FS and the two end faces of the movable side MS are arranged at the same positions, so one of the endpiece members 20 is engaged with both the top end part 25T of the ridge 25 and the top end part 6T of the slide guide 6, while the other is engaged with both the bottom end part 6B of the slide guide 6 and the bottom end part 25B of the ridge 25. By movement to the intermediate position of the ridge 25, the tension spring 19 is extended to the maximum extent, but in the intermediate state, the endpiece members 20 apply a downward biasing force to the top end part 25T of the ridge 25 and apply an upward same biasing force to the bottom end part 25B. As a result, the biasing forces which are applied from the endpiece members 20 to the ridge 25 are cancelled and become zero.

If the movable housing moves further in the opening direction from the fixed housing 1 from the intermediate state, the endpiece members 20 which are connected by the tension spring 19 move to the end faces at the opposite sides to their original sides so that the distance between the endpiece members 20 becomes shorter. Explained in more detail, one of the endpiece members 20 becomes engaged with the top end part 6T of the slide guide 6, while conversely the other is engaged with only the bottom end part 25B of the ridge 25. That is, as illustrated by the arrow EX, the end part to which one of the endpiece members 20 applies a biasing force is switched from the tip end 25T of the ridge 25 to the tip end 6T of the slide guide 6, while the end part to which the other applies a biasing force is switched from the bottom end part 6B of the slide guide 6 to the bottom end part 25B of the ridge 25.

In FIG. 5A, stage (4) illustrates the final state in the opening operation where the movable housing moves in an opening direction from the fixed housing 1. In the final state, one of the endpiece members 20 is engaged with the tip end 6T of the slide guide 6, while the other is engaged with the bottom end part 25B of the ridge 25. By movement of the ridge 25 in the opening direction, the tension spring 19 contracts compared with the maximum extended state, but is extended compared with the initial state. The biasing force which is applied from an endpiece member 20 to the bottom end part 25B of the ridge 25 is larger compared with the initial state. The biasing force at this time becomes the upward (opening) force due to the tension of the initial state of the tension spring 19 plus the biasing force of the spring constant times the amount of extension of the tension spring 19. That is, an assist force works in the direction opposite to the original one, that is, a direction in which the movable housing opens from the fixed housing 1.

In FIG. 5A, stage (5) illustrates the end state of the opening operation where the movable housing is completely opened from the fixed housing 1. At stage (5), one of the endpiece members 20 is engaged with the top end part 6T of the slide guide 6, while the other is engaged with the bottom end part 25B of the ridge 25. In the completed state of the opening operation, an upward (opening) force due to the tension of the initial state of the tension spring 19 acts on the bottom end part 25B of the ridge 25 from the endpiece member 20.

The range of operation of the endpiece members 20 is from a position where the range of overlap A of the two ends physically enables generation of a large initial tension due to the natural length of the tension spring 19 up to a range where a similar state is satisfied at the reverse position of overlap. The extension of the tension spring 19 becomes maximum at the center position (spring length=L1). The force acting right before that also becomes maximum. In design, the initial tension is made to become a suitable magnitude (for example, in the case of a mobile phone, 100 gf) and to become a suitable magnitude even at the maximum force near the center (in the case of a mobile phone, 200 gf). Further, the dimensions are designed and the size of the tension spring 19 is selected so that the spring does not suffer from plastic deformation at the time of maximum extension. Usually, the limit of extension of the tension spring 19 is 200% to 300%. Accordingly, the ratio between the minimum value of the superposed range A and the distance L1 between the two ends of the slide guide 6 is 1:2 to 1:3.

FIG. 5B is a graph which illustrates the stepwise change in the biasing force which is applied from the endpiece members 30 to the ridge 25 in the operation of the slide assist system which was explained in FIG. 5A. The abscissa indicates the stage at the time the movable housing moves in the opening direction from the fixed housing 1, while the ordinate indicates the biasing force which is applied from the endpiece members 20 to the ridge 25. The biasing force which is applied from the endpiece members 20 to the ridge 25 includes the initial tension of the tension spring 19 even in the initial state of zero opening of the movable housing. Further, from the initial state to the intermediate point, the biasing force due to the endpiece members 20 acts at the side closing the movable housing. When passing the intermediate point, this biasing force inverts. It is learned that even when the movable housing is in the fully open state, the initial tension of the tension spring 19 acts. The operation for closing the movable housing becomes an operation opposite to the operation for opening it explained above. Similarly, at the stage (3), the positions of the endpiece members 20 of the tension spring 19 are switched and the direction of the assist force is switched.

Figure 6B:
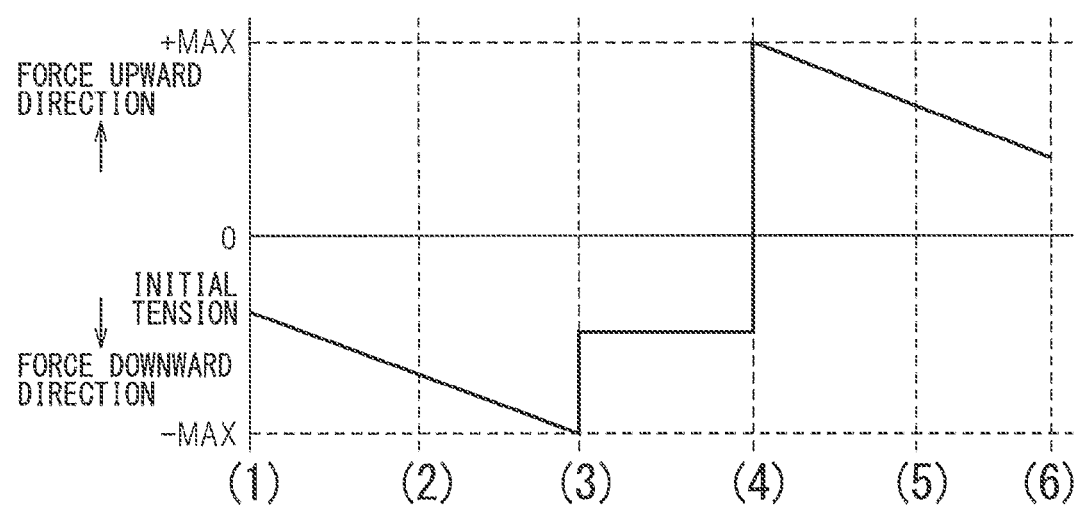
FIG. 6B is a graph which illustrates the change in the assist force which the slide assist system in FIG. 6A gives to the slide system.

Next, the slide assist operation of a second example of the first embodiment of the slide assist system P of the present application will be explained. Here, the case of a second example of the first embodiment of the present application where the distance L1 between the two ends is made smaller than L2 will be explained using FIG. 6A and FIG. 6B. FIG. 6A illustrates the operation of the slide assist system P of the second example of the first embodiment of the present application by stages (1) to (6). (1) illustrates the initial state where the movable housing is closed over the fixed housing 1. The broken line MA in the figure illustrates the range of movement of the movable side MS (ridge 25). Further, the arrow illustrated by the bold line illustrates the magnitude and direction of the force which acts on the movable side MS. At stage (1), one of the endpiece members 20 is engaged with the top end part 25T of the ridge 25, while the other is engaged with the bottom end part 6B of the slide guide 6. A downward (closing) force due to the tension of the initial state of the tension spring 19 acts on the top end part 25T of the ridge 25 from the endpiece member 20.

In FIG. 6A, stage (2) is similar to step (2) of the first example and illustrates the initial state of an opening operation where the movable housing moves in an opening direction from the fixed housing 1. In the initial state, one of the endpiece members 20 remains engaged with the top end part 25T of the ridge 25, while the other remains engaged with the bottom end part 6B of the slide guide 6. Movement of the ridge 25 in the opening direction causes the tension spring 19 to be extended resulting in the biasing force which is applied from an endpiece member 20 to the top end part 25T of the ridge 25 becoming larger. The biasing force at this time becomes the downward (closing) force due to the tension of the initial state of the tension spring 19 plus the biasing force of the spring constant times the amount of extension of the tension spring 19.

In FIG. 6A, stage (3) illustrate the state where the movable housing opens further from the fixed housing 1 from the initial state and one of the endpiece members 20 is switched from engagement with the top end part 25T of the ridge 25 to the top end part 6T of the slide guide 6. The other of the endpiece members 20 still remains engaged with the bottom end part 6B of the slide guide 6 since the distance L2 between the two ends of the ridge 25 is longer than the distance L1 between the two ends of the slide guide 6. In this state, the endpiece members 20 both bias the two end parts of the slide guide 6, while no biasing force from the endpiece members 20 is applied to the two end parts of the ridge 25. Therefore, the ridge 25 is not subjected to biasing force from the tension spring 19.

From stage (3) on, if the movable housing moves slightly in the opening direction from the fixed housing 1, the endpiece members 20 which are connected by the tension spring 19 become shorter in distance by having one (top side) endpiece member 20 move to the top end part 6T of the slide guide 6. The other (bottom side) endpiece member 20 remains engaged with the bottom end part 6B of the slide guide 6, so in this state, the ridge 25 is not acted upon by the tension of the tension spring 19. However, the endpiece members 20 contact the ridge 25 from the side surfaces, so a resistance force of the frictional force is generated at the time of movement of the ridge 25. That is, the ridge 25 is not given the biasing force from the tension spring 19. In the non-tension state, just a frictional force acts between the ridge 25 and the endpiece members 20.

In FIG. 6A, stage (4) illustrates the state where the movable housing moves further in an opening direction from the fixed housing 1, one of the endpiece members 20 remains engaged with the top end part 6T of the slide guide 6, and the other arrives near the position where it is switched from engagement with the bottom end part 6B of the slide guide 6 to the bottom end part 25B of the ridge 25. If the movable housing moves further in the opening direction from the fixed housing 1, the engagement of the other endpiece member 20 which had been engaged with the bottom end part 6B of the slide guide 6 switches from the bottom end part 6B of the slide guide 6 to the bottom end part 25B of the ridge 25. After this, the endpiece member 20, as illustrated in FIG. 6A, stage (5), continues to push against the bottom end part 25B of the ridge 25.

In FIG. 6A, stage (6) illustrates the end state of the opening operation where the movable housing is fully opened from the fixed housing 1. At the stage (6), one of the endpiece members 20 is engaged with the top end part 6T of the slide guide 6, while the other is engaged with the bottom end part 6B of the ridge 6. In the end state of the opening operation, an upward (opening) force due to the tension of the initial state of the tension spring 19 acts on the bottom end part 25B of the ridge 25 from the endpiece member 20. The range of operation of the endpiece members 20 is, in the same way as when L1=L2, the range where the range of overlap A satisfies a certain condition. Even if using the same size of tension spring 19, a larger amount of movement of the movable housing can be secured by the amount of the existence of the non-tension state.

FIG. 6B illustrates the stepwise change in the biasing force which is applied from the endpiece members 20 to the ridge 25 in the operation of the slide assist system which is explained in FIG. 6A. The abscissa indicates the stage at the time the movable housing moves in an opening direction from the fixed housing, while the ordinate indicates the biasing force which is applied from the endpiece members to the ridge. The biasing force which is applied from the endpiece members to the ridge initially acts on the side closing the movable housing. After a while, the biasing force from the endpiece members on the ridge 25 disappears. However, since there is frictional force, there is a resistance force at the time of an operation opening the movable housing. Further, an opposite direction force starts to be generated from the point of time when engagement of the endpiece member 20 switches to the bottom end part 25B of the ridge 25 and continues until the fully opened state. Even in the fully opened state, it is learned that there is an initial tension.

Figure 7B:
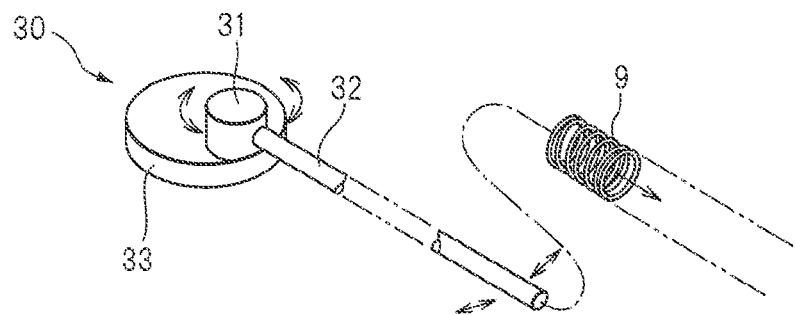
FIG. 7B is a perspective view which illustrates the configuration of an embodiment of endpiece members which are attached to the two ends of a compression spring which is illustrated in FIG. 7A.

FIG. 7A illustrates a slide assist operation of one example of the second embodiment of the slide assist system P of the present application. The second embodiment differs from the first embodiment in the use of a compression spring 9 as the elastic member. When using a compression spring 9 as the elastic member, each endpiece members 30, in the second embodiment, as illustrated in FIG. 7B, is comprised of a disk-shaped body 33 on which a rotary post 31 is attached near the outer circumference and with a rod 32 provided sticking out from the side surface of this rotary post 31. This rod 32 has the compression spring 9 attached to it by insertion over it. Due to this configuration, the compression spring 9 can swivel with respect to the endpiece member 30.

Further, in the second embodiment, the top end part side and the bottom end part side of the slide guide 16 are respectively provided with an upper groove 16U and a lower groove 16L. On the other hand, the ridge 26 is also provided at its top end part side and its bottom end part side respectively with an upper groove 26U and a lower groove 26L. The upper groove 16U and the lower groove 16L of the slide guide 16 and the upper groove 26U and the lower groove 26L of the ridge 26 may be rectangular in cross-sectional shape. However, in this embodiment, among these grooves, the wall surfaces of the grooves at the center parts of the slide guide 16 and the ridge 26 are not subjected to biasing forces from the endpiece members 30, so are formed as slanted surfaces. Note that, the distance L1 between the upper groove 16U and the lower groove 16L of the slide guide 16 and the distance L2 between the upper groove 26U and the lower groove 26L of the ridge 26 are the same in this embodiment.

FIG. 7A illustrates the stages of the operation of the slide assist system of the second embodiment of the present application from stage (1) to stage (5). Stage (1) illustrates the initial state where the movable housing is closed over the fixed housing 1. In the figure, the broken line MA illustrates the range of movement of the movable side MS (ridge 26), while the one-dot chain line AX illustrates the axis of movement of the movable side. Further, the arrow mark which is indicated by the bold line illustrates the magnitude and direction of the force which acts on the movable side.

In FIG. 7A, stage (1), one of the endpiece members 30 (top side endpiece member 30) is engaged with an upper groove 16U of the slide guide 16, while the other (bottom side endpiece member 30) is engaged with a lower groove 26L of the ridge 26. An upward force due to the pushing force of the initial state of the compression spring 9 acts on the top end face of the upper groove 16U of the slide guide 16 from the endpiece member 30, while a downward (closing) force due to the pushing force of the initial state of the compression spring 9 acts on the bottom end face of the lower groove 26L of the ridge 26.

In FIG. 7A, stage (2) illustrates the initial state of the opening operation where the movable housing moves in the opening direction from the fixed housing 1. In the initial state, one of the endpiece members 30 remains engaged with the upper groove 16U of the slide guide 16, while the other remains engaged with the lower groove 26L of the ridge 26. Movement of the ridge 26 in the opening direction causes the compression spring 9 to be contracted and the biasing force which is applied from the endpiece member 30 to the bottom end face of the lower groove 26L of the ridge 26 to become larger. SP illustrates the amount of compression of the compression spring 9. At this time, the biasing force becomes the downward (closing) force due to the pushing force of the initial state of the compression spring 9 plus the biasing force of the spring constant times the amount of compression of the compression spring 9.

In FIG. 7A, stage (3) illustrates the intermediate state of the opening operation where the movable housing moves in the opening direction from the fixed housing 1 and opens to a state of half of the fully open state. In the intermediate state, one of the endpiece members 30 is engaged with both the upper groove 16U of the slide guide 16 and the upper groove 26U of the ridge 26, while the other is engaged with the lower groove 16L of the slide guide 16 and the lower groove 26L of the ridge 26. The movement of the ridge 26 to the intermediate position causes the compression spring 9 to be contracted to its maximum extent, but in the intermediate state, the endpiece members 30 apply an upward biasing force to the top end face of the upper groove 26U of the ridge 26 and apply the same downward biasing force to the bottom end face of the lower groove 26L. As a result, the biasing forces which are applied from the endpiece members 30 to the ridge 26 are cancelled out and become zero.

If the movable housing moves further in the opening direction from the fixed housing 1 from the intermediate state, one of the endpiece members 30 becomes engaged with the upper groove 26U of the ridge 26 while conversely the other of the endpiece members 30 becomes engaged with the lower groove 16L of the slide guide 16. That is, the portion to which one of the endpiece members 30 applies a biasing force is switched from the upper groove 16U of the slide guide 16 to the upper groove 26U of the ridge 26, while the end part to which the other of the endpiece members 30 applies a biasing force is switched from the lower groove 26L of the ridge 26 to the lower groove 16L of the slide guide 16.

In FIG. 7A, stage (4) illustrates the final state of the opening operation where the movable housing moves in the opening direction from the fixed housing 1. In the final state, one of the endpiece members 30 is engaged with the upper groove 26U of the ridge 26, while the other of the endpiece members 30 is engaged with the lower groove 16L of the slide guide 16. Movement of the ridge 26 in the opening direction causes the compression spring 9 to be contracted more than its maximum contracted state, but expanded more than its initial state. The biasing force which is applied from the endpiece member 30 to the upper groove 26U of the ridge 26 is larger than the initial state. At this time, the biasing force becomes the downward (opening) force due to the tension of the initial state of the compression spring 9 plus the biasing force of the spring constant times the amount of contraction of the compression spring 9.

In FIG. 7A, stage (5) illustrates the end state of the opening operation where the movable housing is fully opened from the fixed housing 1. At stage (5), one of the endpiece members 30 is engaged with the upper groove 26U of the ridge 26, while the other of the endpiece members 30 is engaged with the lower groove 16L of the slide guide 16. In the end state of the opening operation, an upward (opening) force due to the pushing force of the initial state of the compression spring 9 acts on the upper groove 26U of the ridge 26 from the endpiece member 30.

In the operation of the slide assist system P of the second embodiment of the present application which was explained using FIG. 7A, the change in the biasing force which is applied to the ridge 26 from the endpiece members 30 is the same as the change in the biasing force which is applied to the ridge 25 from the endpiece members 20 which was explained in FIG. 5B, so illustration is omitted. Further, in FIG. 7A, an example where the distance L1 between the upper groove 16U and the lower groove 16L of the slide guide 16 and the distance L2 between the upper groove 26U and the lower groove 26L of the ridge 26 are the same was explained, but the operation when the distance L2 is longer than the distance L1 is similar to the second example of the first embodiment. Therefore, here, the explanation will be omitted.

Here, various examples of application of the slide assist system P of the present application configured in the above way will be explained. Note that, in the examples which are illustrated below, the example of application of the slide assist system P of the first example of the first embodiment of the present application which was explained with reference to the above-mentioned FIG. 5A is explained, but in the following examples, the second example of the first embodiment and the second embodiment of the present application can also be applied needless to say.

Figure 8A:
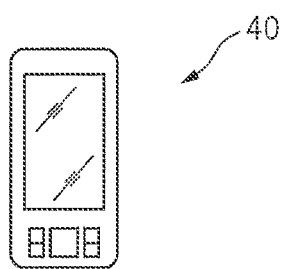
FIG. 8A is a front view which illustrates the closed state of a slide type mobile phone which uses the slide assist system of the first embodiment of the present application.
Figure 8B:
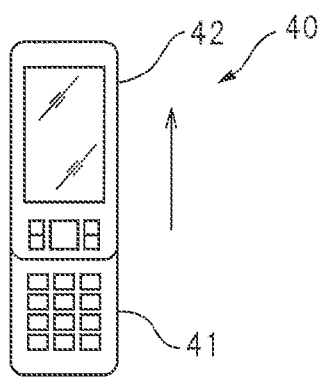
FIG. 8B is a plan view which illustrates the opened state after sliding the display part of the mobile phone of FIG. 8A in the vertical direction.
Figure 8C:
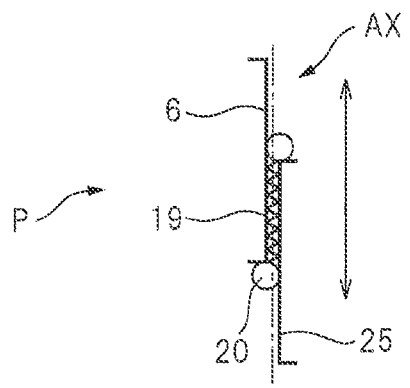
FIG. 8C is a schematic view of the configuration of a slide assist system of the first embodiment of the present application which is built into FIG. 8A and FIG. 8B.

FIG. 8A illustrates the closed state of a slide type mobile phone 40 which uses the slide assist system of the present application, while FIG. 8B illustrates the opened state where the movable housing 42 at the display part of the mobile phone of FIG. 8A is made to slide in the vertical direction from the fixed housing 41. In this example, it is possible to use a slide assist system P such as illustrated in FIG. 8C provided with a slide guide 6, ridge 25, and tension spring 19 with endpiece members 20 connected to its two ends.

Figure 9A:
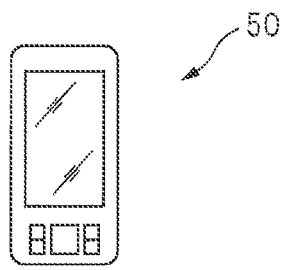
FIG. 9A is a front view which illustrates the closed state of a slide and turn type mobile phone which uses a modification of the first example of the slide assist system of the first embodiment of the present application.
Figure 9B:
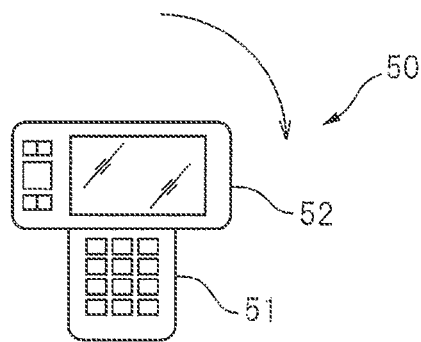
FIG. 9B is a plan view which illustrates the opened state after turning the display part of the mobile phone of FIG. 9A.
Figure 9C:
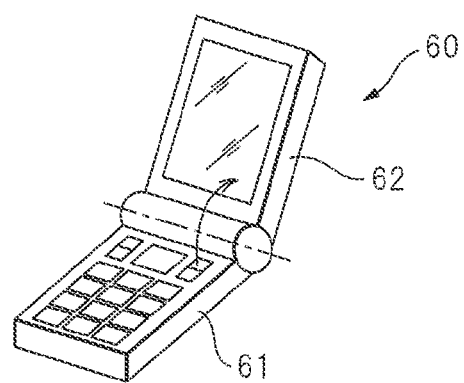
FIG. 9C is a perspective view which illustrates the opened state of a flip open type mobile phone which uses a modification of the first example of the slide assist system of the first embodiment of the present application.
Figure 9D:
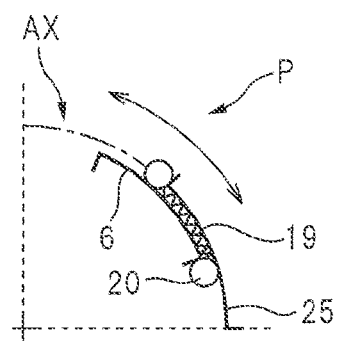
FIG. 9D is a schematic view of the configuration of a slide assist system of the first embodiment of the present application which is built into FIG. 9A, FIG. 9B, and FIG. 9C.

FIG. 9A illustrates the closed state of a slide type mobile phone 50 which uses the slide assist system of the present application, while FIG. 9B illustrates the opened state where the movable housing 52 at the display part of the mobile phone 50 of FIG. 9A is made to turn from the fixed housing 51. In this example, it is possible to use a slide assist system P such as illustrated in FIG. 9D wherein the axis AX which is illustrated by the one-dot chain line is bent in an arc shape. Even when the axis AX is bent, the slide assist system P can be configured provided with a slide guide 6 and ridge 25 which are bent in concentric circular shapes with the axis AX and a tension spring 19 which is connected to the two ends of the endpiece members 20. The slide assist system P which is configured such as in FIG. 9D can also be applied to a flip-open type mobile phone 60 which is configured as illustrated in FIG. 9C so that the movable housing 62 folds over the fixed housing.

Figure 10A:
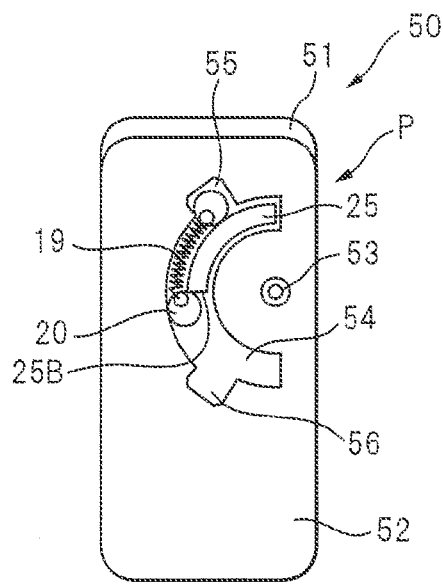
FIG. 10A is a view of the configuration which illustrates the specific configuration of a slide assist system of the present application in a slide and turn type of mobile phone which is illustrated in FIG. 9A.
Figure 10B:
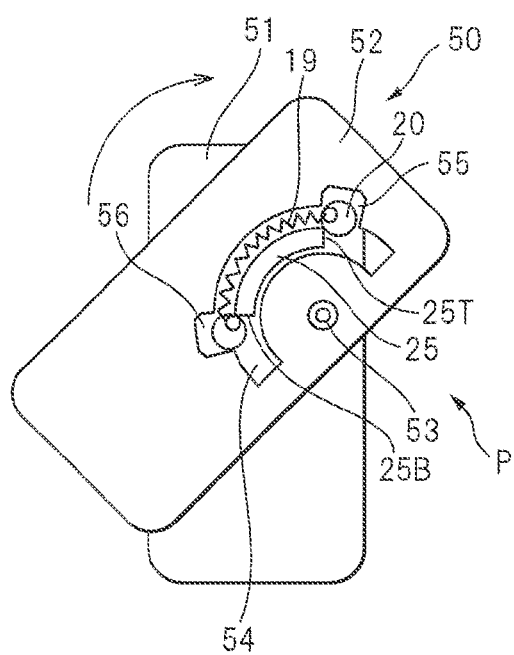
FIG. 10B is a view which illustrates the operation of the slide assist system of the present application while the display part is being turned from the state which is illustrated in FIG. 10A.
Figure 10C:
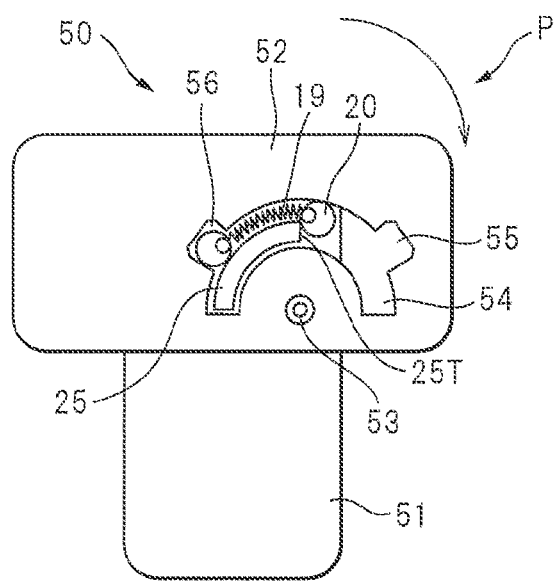
FIG. 10C is a view which illustrates the operation of the slide assist system of the present application when making the display part further turn from the state which is illustrated in FIG. 10B so as to completely open it.

FIG. 10A illustrates the configuration of a specific example of the slide assist system P of the present application in a slide and turn type of mobile phone 50 which is illustrated in FIG. 9A and illustrates the state where the mobile phone 50 is closed. In this example, the movable housing 52 turns with respect to the fixed housing 51 about a rotary shaft 53, so the movable housing 52 side is not provided with slide rails, but with arc-shaped guide grooves 54 and recessed parts 55 and 56. In the state which is illustrated in FIG. 10A where the mobile phone 50 is closed, the endpiece members 20 bias the recessed part 55 and the bottom end part 25B of the ridge 25. Further, in the state which is illustrated in FIG. 10B where the mobile phone 50 is at an intermediate position between the closed state and the fully open state, the endpiece members 20 are at the positions of the recessed part 55 and the recessed part 56 and bias the top end part 25T and the bottom end part 25B of the ridge 25. Furthermore, in the state which is illustrated in FIG. 10C where the mobile phone 50 is fully opened, the endpiece members 20 bias the recessed part 56 and the top end part 25T of the ridge 25.

Figure 11A:
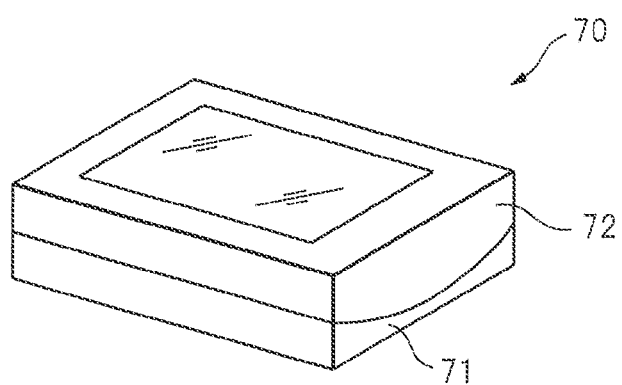
FIG. 11A is a perspective view which illustrates a closed state of a desktop terminal device which uses a modification of the first example of the slide assist system of the first embodiment of the present application.
Figure 11B:
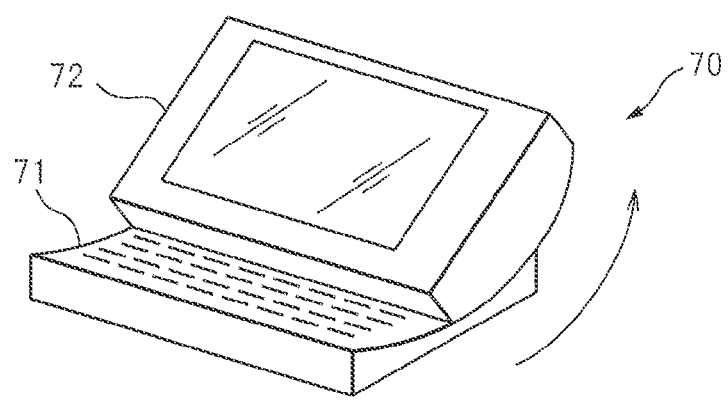
FIG. 11B is a perspective view which illustrates an open state after sliding the display part of the terminal device of FIG. 11A in the vertical direction.
Figure 11C:
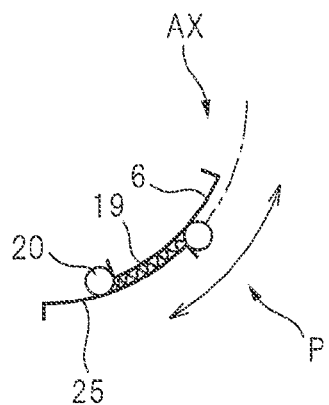
FIG. 11C is a schematic view of the configuration of a slide assist system of a first embodiment of the present application which is built into FIG. 11A and FIG. 11B.

FIG. 11A illustrates a closed state of a desktop terminal device 70 which uses the slide assist system of the present application, while FIG. 11B illustrates an opened state where the movable housing 72 at a display part of the terminal device 70 of FIG. 11A is made to slide from the fixed housing 71 over an arc-shaped surface. For this example, it is possible to use a slide assist system P such as illustrated in FIG. 11C where the axis AX which is illustrated by the one-dot chain line is bent in an arc shape. Even when the axis AX is bent, the slide assist system P can be configured provided with a slide guide 6 and ridge 25 which are bent to concentric circles with the axis AX and a tension spring 19 which is connected with the endpiece members 20 at its two ends.

Figure 12:
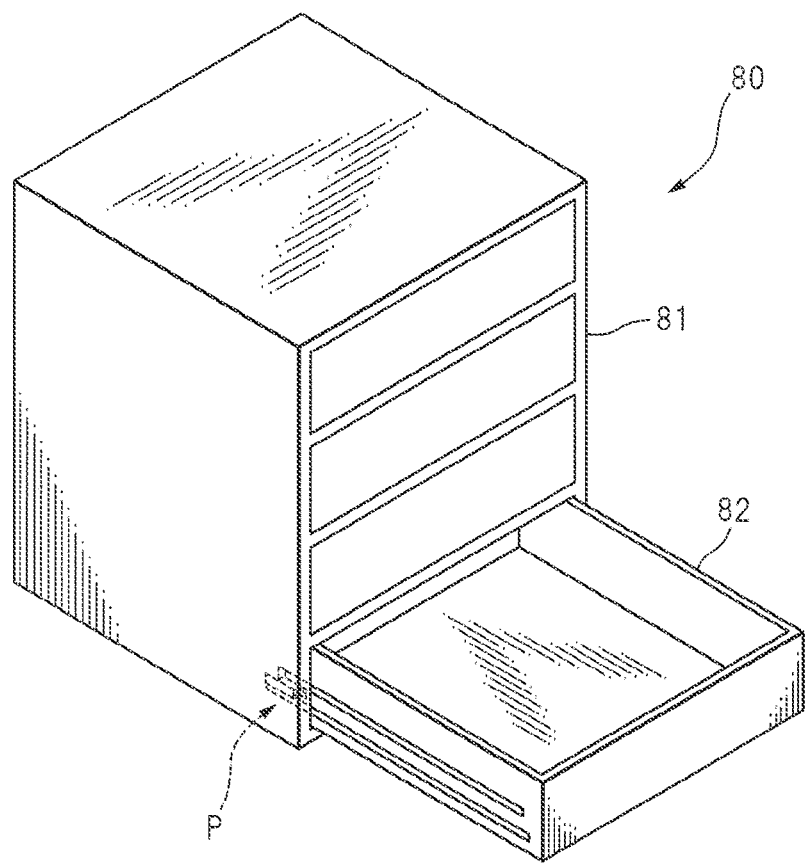
FIG. 12 is a perspective view which illustrates an example of attaching the slide assist system of the present application to a side surface of a drawer of a clothing dresser.

FIG. 12 illustrates an example of attaching the slide assist system P of the present application between a side surface of a drawer 82 of a chest of drawers 80 and the chest body 81. If attaching the slide assist system P of the present application between the side surface of a drawer 82 of the chest of drawers 80 and the chest body 81, an assist force is obtained near when opening up a drawer 81 wide and near when closing the drawer 81, so the drawer 81 becomes easier to open and the drawer 81 can be reliably closed.

Figure 13:
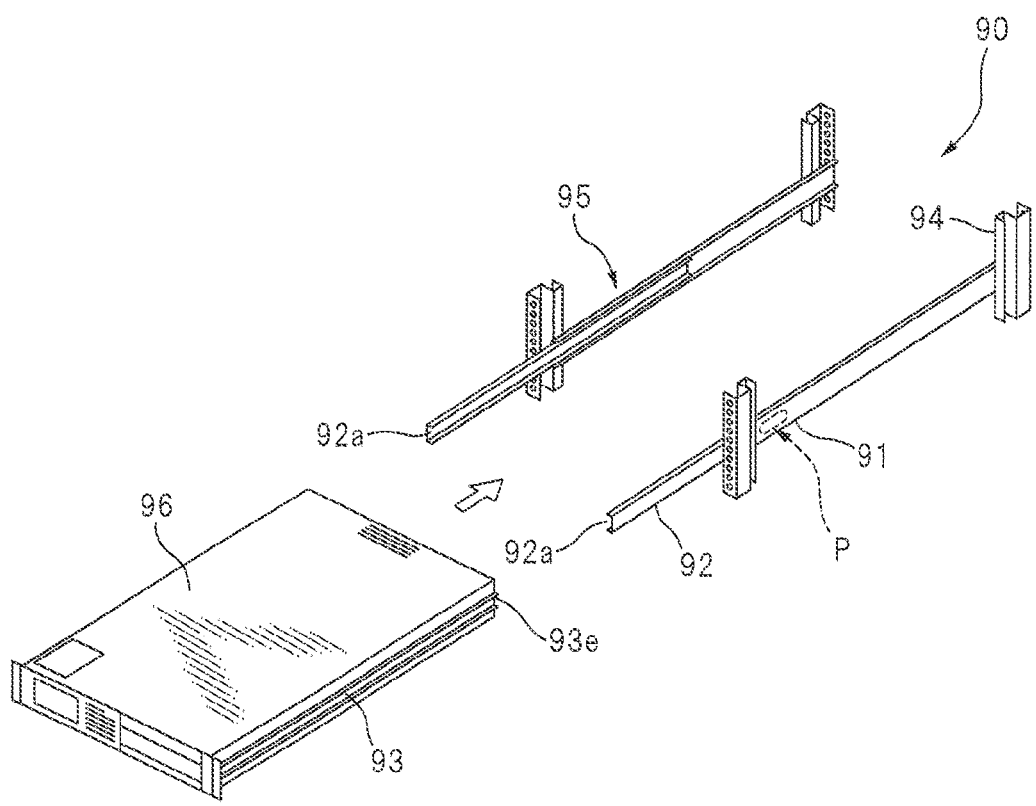
FIG. 13 is a perspective view which illustrates an example of attaching the slide assist system of the present application to mounting parts to a rack of a server.

FIG. 13 illustrates an example of attaching the slide assist system P of the present application to mounting parts to a rack 90 of a server 96. The rack 90 has four columns 94. A large number of servers 96 are stored stacked in the vertical direction by using the slide rails 95. Each slide rail 95 is comprised of an outer rail 91, an intermediate rail 92, and an inner rail 93. The outer rail 91 is a fixed rail which is attached to a fixed object (columns 94), while the inner rail 93 is attached to a moving member (server 96) which is pulled out from the fixed objects. Further, the intermediate rail 92 is provided between the outer rail 91 and the inner rail 93 so as to increase the pulled out length of the inner rail 93 which is pulled out from the outer rail 91.

The inner rails 93 can be detached from the intermediate rails 92 by disengaging the engagement mechanisms. When attaching a server 96 to the rack 90, the inner rails 93 which are attached to the two sides of the server 96 are positioned horizontally and the back end parts 93e of the inner rails 93 are inserted straight into the insertion openings 92a of the intermediate rails 92 simultaneously at the left and right. In such a rack 95, a slide assist system P of the present application can, for example, be installed between an outer rail 91 and an intermediate rail 92.

Figure 14:
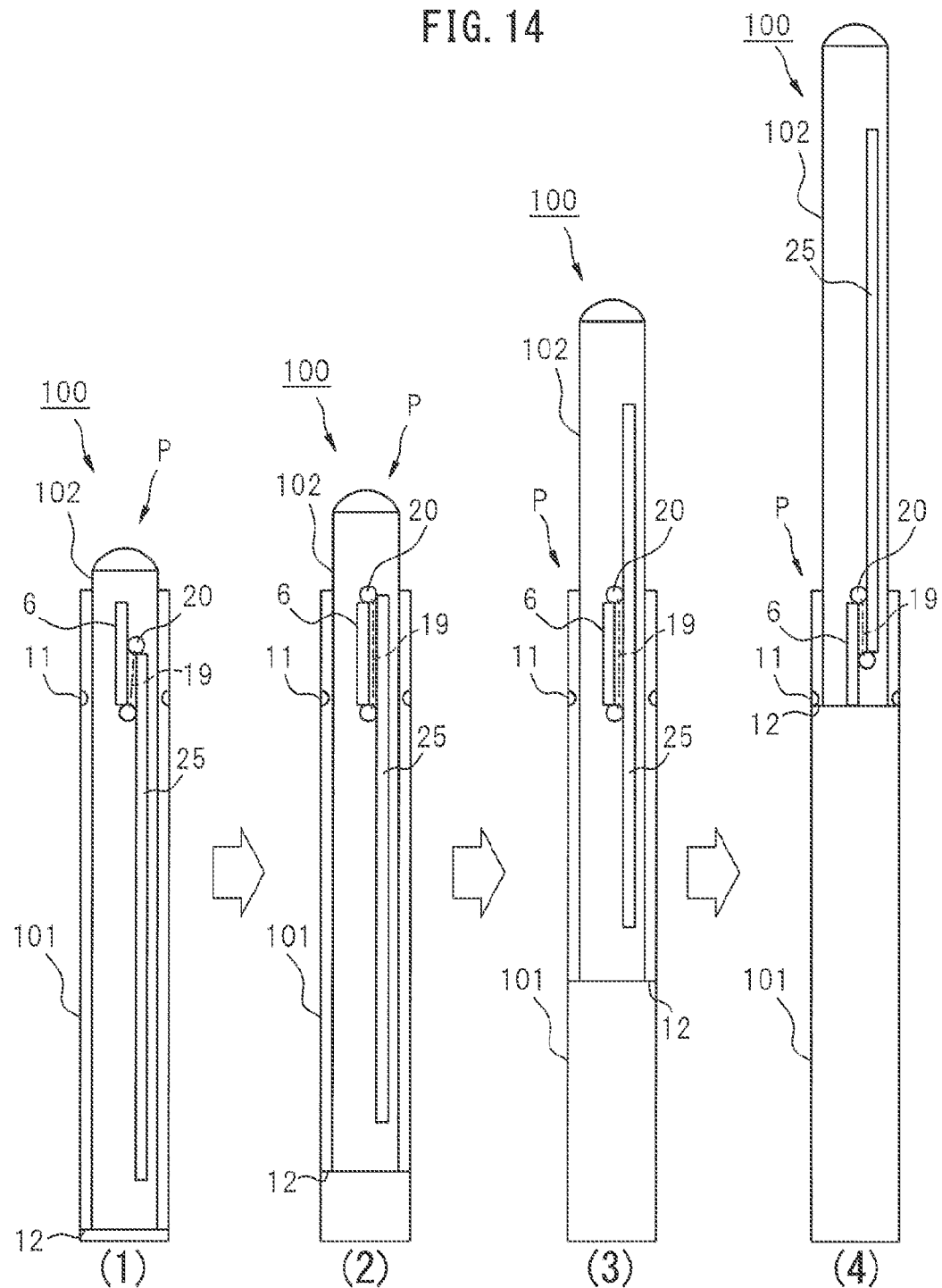
FIG. 14 is a transition chart which illustrates an example of attaching the slide assist system of the present application to a telescoping part of a rod.

FIG. 14 is a transition chart which illustrates an example of attaching the slide assist system P of the present application to a telescoping part of a telescoping rod 100. The telescoping rod 100 is comprised of an outer rod 101 in which a telescoping inner rod 102 is provided. The slide assist system P is configured from a slide guide 6, ridge 25, and tension spring 19 which is connected with endpiece members 20 at its two ends in the same way as the examples explained above. The length of the ridge 25 may be determined based on the length of the inner rod 102. Further, the inside wall of the outer rod 101 is provided with a stopper 11 which prevents the inner rod 102 from being withdrawn. At the bottom part of the inner rod 102, a flange 12 which engages with the stopper 11 is provided.

Stage (1) illustrates the state where the inner rod 102 is stored in the outer rod 101. Further, stage (2) illustrates the state when the inner rod 102 is pulled out from the outer rod 101 and the endpiece members 20 engage with the two ends of the slide guide 6, while stage (3) illustrates the state when pulling out the inner rod 102 where only a frictional force acts between the outer rod 101 and the inner rod 102. Further, stage (4) illustrates the state where the flange 12 which is at the bottom of the inner rod 102 engages with the stopper 11 and the inner rod 102 is completely extended out. The operations of the slide assist system P at the various stages are similar to those of the above-mentioned examples, so the explanations will be omitted. In this example, the telescopic rod 100 is a two-stage one, but the slide assist system P of the present application can also be applied to a three-stage or more multiple stage rod.

According to the slide assist system P of the present application which was explained above, just the movement of the endpiece members along the axis and the action of the elastic member enable generation of an assist force when sliding the two housings open or closed. Also, the space which is occupied by the slide assist system P can be reduced. Therefore, the system for sliding the housings open and closed can be made thinner. That is, according to the slide assist system of the present application, by just the movement of a small number of parts along an axis of a sliding direction of two objects which slide relative to each other or a rod-shaped object which slides in multiple stages, an assist force can be generated at the time of sliding, so the space which is occupied by the slide assist system in the system for sliding the housings open and closed becomes smaller and the system for sliding the housings open and closed can be made thinner.

Further, according to the terminal device which mounts the slide assist system of the present application, the slide operation when making the display part slide with respect to the keyboard part to extend it at the time of use and the slide operation when making the display part slide with respect to the keyboard part at the time of storage become much more reliable due to the slide assist system which is provided at the slide mechanism.

Note that, the slide assist system which was explained above is one example. The slide rail and the slide guide were explained in numerous examples as being provided sticking out from the facing surfaces of the fixed housing and the movable housing, but the slide rail and the slide guide, as in the example which was explained from FIG. 10A to FIG. 10C, may of course also be made to stick out from inside grooves which are provided in the facing surfaces of the fixed housing and the movable housing so as to reduce the clearance between the fixed housing and the movable housing. Further, in the examples which were explained above, the slide guide at the fixed housing is used as the ridge of the fixed housing side, but the ridge of the fixed housing side need not double as a slide guide and may be provided independently as well.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A slide assist system which is provided at facing surfaces of a fixed housing and a movable housing which can slide with respect to the fixed housing along a predetermined axis by a predetermined distance, wherein the slide assist system is configured provided with
- a columnar elastic member which can expand and contract,
- endpiece members which are attached to the two ends of the elastic member to be able to swivel and are provided with horizontal widths which are larger than the horizontal width of the elastic member,
- a fixed housing side ridge which is provided sticking out at a facing surface of the fixed housing, extends in the axial direction, and is provided with a predetermined length and which is provided with engagement parts with the endpiece members at its two end sides, and
- a movable housing side ridge which is provided sticking out at a facing surface of the movable housing, extends in the axial direction, and is provided with a predetermined length and which is provided with engagement parts with the endpiece members at its two end sides,
- the fixed housing side ridge and the movable housing side ridge have a clearance able to hold the columnar elastic member and are arranged at the fixed housing and the movable housing,
- the elastic member is inserted into the clearance between the fixed housing side ridge and the movable housing side ridge and, in the state of insertion of the elastic member into the clearance, one of the endpiece members which are positioned at the two ends of the elastic member is made to engage with an engagement part of the fixed housing side ridge while the other is made to engage with an engagement part of the movable housing side ridge, and the engagement parts are acted on by a biasing force of one of an attraction force which pulls them to the elastic member side and a pushing force which pushes them in a direction separating from the elastic member side, and,
- in the state where the fixed housing and the movable housing are superposed and in the state where the movable housing slides with respect to the fixed housing by a predetermined distance, the engagement part of the fixed housing side ridge and the engagement part of the movable housing side ridge which engage with the same endpiece member are switched.

2. The slide assist system as set forth in claim 1, wherein the elastic member is a tension spring,
the engagement parts with the endpiece members which are provided at the two end sides of the fixed housing side ridge and the movable housing side ridge are the respective two end faces of the fixed housing side ridge and the movable housing side ridge.

3. The slide assist system as set forth in claim 1, wherein the elastic member is a compression spring,
the engagement parts with the endpiece members which are provided at the two end sides of the fixed housing side ridge and the movable housing side ridge are recessed parts which are provided by indenting the facing surfaces of the fixed housing side ridge and the movable housing side ridge.

4. The slide assist system as set forth in claim 1, wherein the fixed housing side ridge and the movable housing side ridge have the same lengths.

5. The slide assist system as set forth in claim 1, wherein the fixed housing side ridge and the movable housing side ridge have different total lengths.

6. The slide assist system as set forth in claim 3, wherein the endpiece members are one of disk shaped members and spherical members, and hook parts which are provided at the two end parts of the spring are connected to positions of the disk shaped members or spherical members which are offset from the center points.

7. The slide assist system as set forth in claim 1, wherein the predetermined axis is a straight line.

8. The slide assist system as set forth in claim 1, wherein the predetermined axis is arc shaped.

9. The slide assist system as set forth in claim 7, wherein the fixed housing and the movable housing are configured to slide by a slide rail and a slide guide which moves by sliding on the slide rail, and
one of the fixed housing side ridge and the movable housing side ridge doubles as the slide guide.

10. The slide assist system as set forth in claim 7, wherein one of the fixed housing side ridge and the movable housing side ridge is provided in a groove which is formed in the facing surface so as to stick out in a direction which is parallel to the facing surface, and
the other of the fixed housing side ridge and the movable housing side ridge is provided so as to stick out in the groove.

11. The slide assist system as set forth in claim 9, wherein the fixed housing and the movable housing are a keyboard part which is provided with operating buttons and a display part which is provided with a display screen in a mobile communication device.

12. The slide assist system as set forth in claim 9, wherein the fixed housing and the movable housing are a main body of a furnishing and a drawer which is pulled out from the furnishing.

13. The slide assist system as set forth in claim 9, wherein the fixed housing and the movable housing are outer rails and inner rails of two slide rails which are attached to a rack which holds a server.

14. Slide assist systems which are provided at facing surfaces of a tubular fixed housing and a plurality of movable housings which have horizontal widths which become smaller in stages in an axial direction of the tubular fixed housing and which can slide by increments of a predetermined distance in multiple stages, wherein each slide assist system is provided with
- a columnar elastic member which can expand and contract,
- endpiece members which are attached to the two ends of the elastic member to be able to swivel and are provided with horizontal widths which are larger than the horizontal width of the elastic member,
- a first ridge which is provided sticking out at the facing surface of one of two adjacent housings, extends in the axial direction, and is provided with a predetermined length and which is provided with engagement parts with the endpiece members at its two end sides, and
- a second ridge which is provided sticking out at the facing surface of the other of the two adjacent housings, extends in the axial direction, and is provided with a predetermined length and which is provided with engagement parts with the endpiece members at its two end sides,
- the first ridge and the second ridge have a clearance able to hold the columnar elastic member and are arranged at the two adjacent housings,
- the elastic member is inserted in the clearance of the first ridge and the second ridge and, in the state of insertion of the elastic member into the clearance, one of the endpiece members which are positioned at the two ends of the elastic member is made to engage with an engagement part of the first ridge while the other is made to engage with an engagement part of the second ridge, and the engagement parts are acted on by a biasing force of one of an attraction force which pulls them to the elastic member side and a pushing force which pushes them in a direction separating from the elastic member side, and, in the state where the two adjacent housings are superposed and in the state where they slide by the predetermined distance, the engagement part of the first ridge and the engagement part of the second ridge which engage with the same endpiece member are switched.

15. The slide assist systems as set forth in claim 14, wherein
each the elastic member is a tension spring,
the engagement parts with the endpiece members which are provided at the two end sides of each the first ridge and each the second ridge are the respective two end faces of the first ridge and the second ridge.

16. The slide assist systems as set forth in claim 14, wherein
each the elastic member is a compression spring, and
the engagement parts with the endpiece members which are provided at the two end sides of each the first ridge and each the second side ridge are recessed parts which are provided by indenting the facing surfaces of the first ridge and the second ridge.

17. A mobile terminal which is provided with a keyboard part which is provided with operating buttons and a display part which is provided with a display screen and in which the display part can slide or turn with respect to the keyboard part along a predetermined axis by a predetermined distance, wherein the mobile terminal is provided with a slide assist mechanism at a slide mechanism or turn mechanism of the keyboard part and the display part, the slide assist mechanism is configured provided with
a columnar elastic member which can expand and contract,
endpiece members which are attached to the two ends of the elastic member to be able to swivel and are provided with horizontal widths which are larger than the horizontal width of the elastic member,
a keyboard part side ridge which is provided sticking out at a surface of the keyboard part which faces the display part, extends in the axial direction, and is provided with a predetermined length and which is provided with engagement parts with the endpiece members at its two end sides, and
a display part side ridge which is provided sticking out at a surface of the display part which faces the keyboard part, extends in the axial direction, and is provided with a predetermined length and which is provided with engagement parts with the endpiece members at its two end sides,
the keyboard part side ridge and the display part side ridge have a clearance able to hold the columnar elastic member and are arranged at the keyboard part and the display part,
the elastic member is inserted into the clearance between the keyboard part side ridge and the display part side ridge and, in the state of insertion of the elastic member into the clearance, one of the endpiece members which are positioned at the two ends of the elastic member is made to engage with an engagement part of the keyboard part side ridge while the other is made to engage with an engagement part of the display part side ridge, and the engagement parts are acted on by a biasing force of one of an attraction force which pulls them to the elastic member side and a pushing force which pushes them in a direction separating from the elastic member side, and,
in the state where the keyboard part and the display part are superposed and in the state where the display part slides with respect to the keyboard part by a predetermined distance, the engagement part of the keyboard part side ridge and the engagement part of the display part side ridge which engage with the same endpiece member are switched.

18. The mobile terminal as set forth in claim 17, wherein
the slide mechanism is configured provided with a slide rail and a slide guide which moves by sliding on the slide rail, and
one of the keyboard side ridge and the display side ridge doubles as the slide guide.

19. The mobile terminal as set forth in claim 17, wherein
one of the keyboard side ridge and the display side ridge is provided in a groove which is formed in the facing surface so as to stick out in a direction which is parallel to the facing surface, and
the other of the keyboard side ridge and the display side ridge is provided so as to stick out in the groove.

\* \* \* \* \*